United States Patent
Farrugia et al.

(10) Patent No.: US 12,157,260 B2
(45) Date of Patent: Dec. 3, 2024

(54) MELT EMULSION EXTRUSION METHODS FOR PRODUCING THERMOPLASTIC POLYMER PARTICLES

(71) Applicant: Xerox Corporation, Norwalk, CT (US)

(72) Inventors: Valerie M. Farrugia, Oakville (CA); Michael S. Hawkins, Cambridge (CA); David John William Lawton, Burlington (CA); Carolyn Patricia Moorlag, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 131 days.

(21) Appl. No.: 16/946,627

(22) Filed: Jun. 30, 2020

(65) Prior Publication Data
US 2021/0069958 A1 Mar. 11, 2021

Related U.S. Application Data

(60) Provisional application No. 62/897,494, filed on Sep. 9, 2019.

(51) Int. Cl.
*B29C 48/04* (2019.01)
*B29B 9/10* (2006.01)
(Continued)

(52) U.S. Cl.
CPC ............. *B29C 48/04* (2019.02); *B29B 9/10* (2013.01); *B29B 9/12* (2013.01); *B29C 48/82* (2019.02);
(Continued)

(58) Field of Classification Search
CPC ....... B29B 9/12; B29B 9/10; B29B 2009/125; B29C 48/04; B29K 2101/12
See application file for complete search history.

(56) References Cited

U.S. PATENT DOCUMENTS 4,863,646 A * 9/1989 Watanabe ............ C08J 3/12
264/9
5,369,163 A 11/1994 Chiou et al.
(Continued)

FOREIGN PATENT DOCUMENTS

CA 2093483 A1 5/1994
CN 104 194 326 A 12/2014
(Continued)

OTHER PUBLICATIONS

Time to learn about dynamic optimization of extruder barrel temperatures. https://www.ptonline.com/articles/time-to-learn-about-dynamic-optimization-of-extruder-barrel-temperatures (Year: 2008).*
(Continued)

*Primary Examiner* — Farah Taufiq
(74) *Attorney, Agent, or Firm* — Vorys, Sater, Seymour and Pease LLP

(57) ABSTRACT

A method of making thermoplastic polymer particles may include mixing in an extruder a mixture comprising a thermoplastic polymer and a carrier fluid that is immiscible with the thermoplastic polymer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising thermoplastic polymer particles having a circularity of 0.90 or greater and that comprise the thermoplastic polymer; and separating the solidified particles from the carrier fluid.

19 Claims, 7 Drawing Sheets

(51) Int. Cl.
  *B29B 9/12* (2006.01)
  *B29C 48/80* (2019.01)
  *B29C 48/82* (2019.01)
  *B33Y 70/00* (2020.01)
  *B29K 23/00* (2006.01)
  *B29K 75/00* (2006.01)
  *B29K 77/00* (2006.01)
  *B29K 101/12* (2006.01)

(52) U.S. Cl.
  CPC ............ *B29C 48/834* (2019.02); *B33Y 70/00* (2014.12); *B29B 2009/125* (2013.01); *B29K 2023/12* (2013.01); *B29K 2075/00* (2013.01); *B29K 2077/00* (2013.01); *B29K 2101/12* (2013.01)

(56) References Cited

U.S. PATENT DOCUMENTS

| | | | |
|---|---|---|---|
| 5,397,671 A * | 3/1995 | Bayley | G03G 9/081 |
| | | | 528/480 |
| 5,609,979 A | 3/1997 | Lawson | |
| 5,859,075 A | 1/1999 | Shukla et al. | |
| 7,740,938 B2 | 6/2010 | Helft et al. | |
| 8,822,555 B2 | 9/2014 | Kaiso et al. | |
| 10,655,025 B2 | 5/2020 | Farrugia et al. | |
| 2002/0128356 A1 | 9/2002 | Nakamura et al. | |
| 2006/0222789 A1* | 10/2006 | Dontula | B41M 5/52 |
| | | | 428/32.38 |
| 2011/0064940 A1* | 3/2011 | Filisko | B29B 9/06 |
| | | | 366/342 |
| 2011/0229545 A1 | 9/2011 | Shum et al. | |
| 2011/0293918 A1 | 12/2011 | Lucas et al. | |
| 2015/0152214 A1 | 6/2015 | Uenlue | |
| 2017/0129177 A1 | 5/2017 | Hättig et al. | |
| 2017/0260359 A1* | 9/2017 | Hanyu | C08K 5/103 |
| 2017/0292010 A1* | 10/2017 | Malotky | C08L 1/28 |
| 2018/0007892 A1* | 1/2018 | Farrugia | H01B 1/22 |
| 2018/0022024 A1* | 1/2018 | Saito | C08K 5/0066 |
| | | | 264/482 |
| 2018/0044484 A1 | 2/2018 | Kalyanaraman | |
| 2018/0244862 A1* | 8/2018 | Price | B33Y 70/10 |
| 2021/0213647 A1* | 7/2021 | Watanabe | B29B 7/90 |

FOREIGN PATENT DOCUMENTS

| | | |
|---|---|---|
| CN | 107955191 A | 4/2018 |
| DE | 4115531 A1 | 11/1991 |
| EP | 0 866 088 A | 9/1998 |
| EP | 2374834 A1 | 10/2011 |
| JP | 2001114901 A | 4/2001 |
| JP | 2002080629 A | 3/2002 |
| JP | 2004276539 A | 10/2004 |
| JP | 2006201691 A | 8/2006 |
| JP | 2006321711 A | 11/2006 |
| JP | 2007112888 A | 5/2007 |
| WO | 1993/016415 | 8/1993 |
| WO | 2015/109143 A | 7/2015 |
| WO | 2015/109143 A1 | 7/2015 |
| WO | 2015/197515 A1 | 12/2015 |
| WO | 2020090381 A1 | 5/2020 |

OTHER PUBLICATIONS

EP office action for related matter 20194443.6 dated February 289, 2021.
Asep Bayu Dani Nandiyanto et al, "Progress in developing spray-drying methods for the production of controlled morphology particles: From the nanometer to submicrometer size ranges;" Advanced Powder Technology, vol. 22, No. 1; Sep. 23, 2010.
Goger et al; "Effect of viscosity on solvent-free emulsification: molecular structure;" Ind. Eng. Chem. Res.; vol. 56, pp. 12538-12546, 2017.
Canadian Office Action from corresponding CA Application No. 3,091,843 mailed Aug. 31, 2022.
Stephanie Fanselow et al; "Production of micron-sized polymer particles fr additive manufacturing by melt emulsion;" AIP Conference Proceedings; vol. 1713; Mar. 9, 2016.
Jochen Schmidt et al.; "New approaches towards production of polymer powders for selective laser beam melting of polymers;" AIP Conference Proceedings; vol. 1914; Dec. 15, 2017.
Sebastien Simon et al; "Rheological Properties of Particle-Stabilized Emulsions;" Journal of Dispersion Science and Technology; vol. 31, No. 5; Jan. 1, 2010; pp. 632-640.
H. Patil, et al. Hot-melt extrusion: from theory to application in pharmaceutical applicaitons, AAPS PharmSciTech, vol. 17, No. 1, pp. 20-42, Feb. 2016.
U. Sundararaj, et al. Drop breakup and coalescence in polymer blends: the effects of concentration and compatibilization, Macromolecules 1995, 28, 2647-2657.
R G Kleijnen, et al., Production and Processing of a Spherical Polybutylene Terephthalate Powder for Laser Sintering, Appl. Sci. 2019, 9(7), 1308.
I. Pillin, et al. Crystallization kinetics of poly(butylene terephthalate) (PBT): Influence of additives and free carboxylic acid chain ends. Polym. Eng. Sci. 2001, 41, 178-191.
S Fanselow, et al. AIP Conference Proceedings 1713, 140007 (2016)—Production of micron-sized polymer particles for additive manufacturing by melt emulsification.
M Schmid, et al., AIP Conference Proceedings 1664, 160009 (2015)—Polymer powders for selective laser sintering (SLS).
M Schmid, et al., Additive Manufacturing: Polymers Applicable for Laser Sintering (LS), Procedia Engineering 149 (2016) 457-464.

* cited by examiner

MELT EMULSION EXTRUSION METHODS FOR PRODUCING THERMOPLASTIC POLYMER PARTICLES

TECHNICAL FIELD

The present disclosure relates to thermoplastic polymer particles and methods of making such particles. Such particles, especially the highly spherical thermoplastic polymer particles, may be useful, among other things, as starting material for additive manufacturing.

BACKGROUND

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS). Incomplete interlayer fusion may result in structural weak points, which may be problematic for printing objects having exacting structural and mechanical tolerances.

Powder particulates usable in 3-D printing include thermoplastic polymers, including thermoplastic elastomers, metals and other solidifiable substances. Although a wide array of thermoplastic polymers are known, there are relatively few having properties suitable for use in 3-D printing, particularly when using powder bed fusion (PBF). Additive manufacturing methods using powdered materials include PBF, selective laser sintering (SLS), selective heat sintering (SHM), selective laser melting (SLM), electron beam melting (EBM), binder jetting, and multi jet fusion (MJF). In the SLS printing method, the particles are fused together by the energy from a high-powered laser. Typical thermoplastic polymers suitable for use in 3-D printing include those having sharp melting points and recrystallization points about 20° C. to 50° C. below the melting point. This difference may allow more effective coalescence between adjacent polymer layers to take place, thereby promoting improved structural and mechanical integrity.

For good printing performance to be realized using powder particulates, particularly polymer powder particulates, the powder particulates need to maintain good flow properties in the solid state. Flow properties may be evaluated, for example, by measuring the fraction of powder particulates from a sample that are able to pass through a standard sieve of a specified size and/or measuring of the angle of repose. High fractions of sievable powder particulates may be indicative of the particulates existing as non-agglomerated, substantially individual particulates, which may be characteristic of ready powder flow. Lower values of the angle of repose, in addition, may be characteristic of ready powder flow. A relatively narrow particle size distribution and regularity of the particulate shape in a sample may also aid in promoting good powder flow performance.

Commercial powder particulates are oftentimes obtained by cryogenic grinding or precipitation processes, which may result in irregular particulate shapes and wide particle size distributions. Irregular particulate shapes may result in poor powder flow performance during 3-D printing processes. In addition, powder particulates having shape irregularity, especially those obtained from current commercial processes, may afford poor packing efficiency following deposition and consolidation, thereby resulting in extensive void formation in a printed object due to the powder particulates not packing closely together during deposition. Wide particle size distributions may be similarly problematic in this regard. Although poor powder flow performance may be addressed to some degree through dry blending with fillers and flow aids, these techniques may have limited effectiveness with softer polymer materials, such as elastomers, due to particulate aggregation.

SUMMARY OF THE INVENTION

The present disclosure relates to thermoplastic polymer particles and melt emulsion extrusion methods of making such particles. Such particles, especially the highly spherical thermoplastic polymer particles, may be useful, among other things, as starting material for additive manufacturing.

Described herein is a composition comprising: a method comprising: mixing in an extruder a mixture comprising a thermoplastic polymer and a carrier fluid that is immiscible with the thermoplastic polymer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising thermoplastic polymer particles having a circularity of 0.90 or greater and that comprise the thermoplastic polymer; and separating the solidified particles from the carrier fluid.

Described herein is a method comprising: a composition comprising: particles comprising thermoplastic polymer particles having a circularity of 0.90 or greater.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
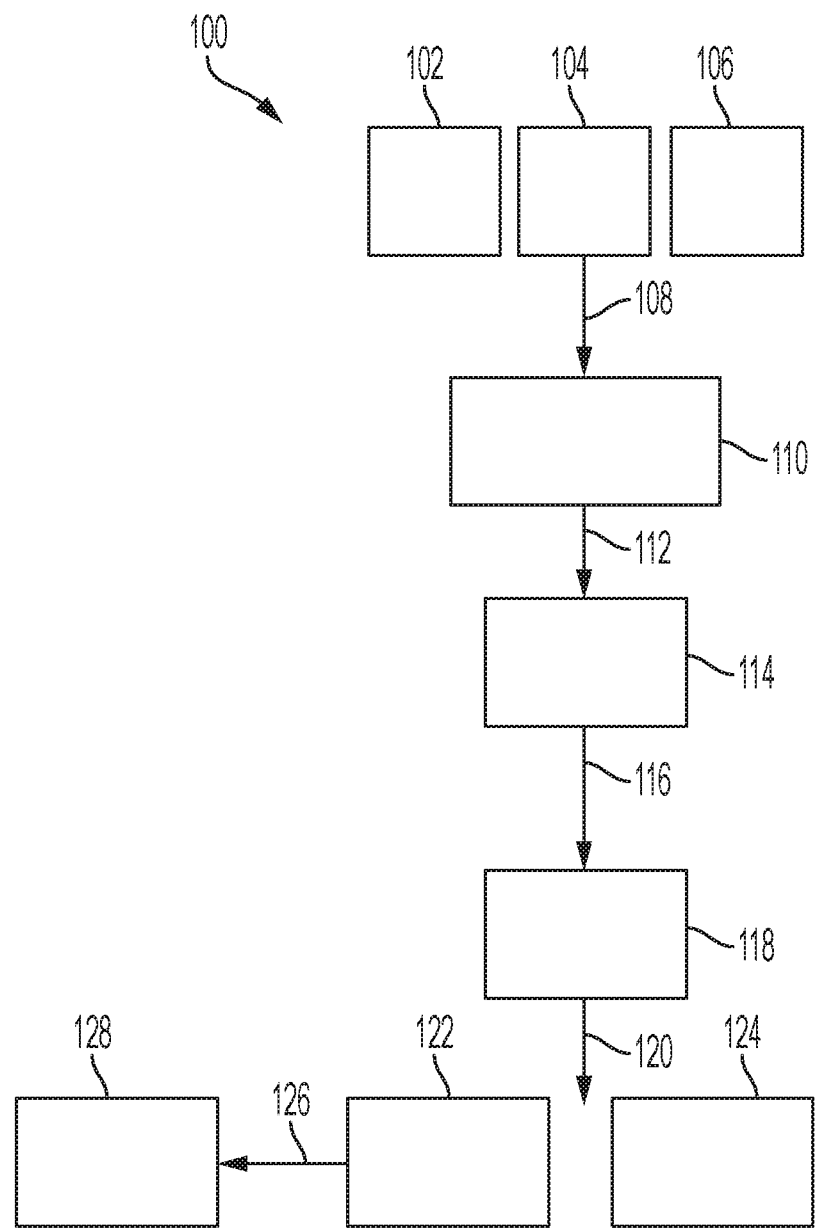
FIG. 1 is a flow chart of a nonlimiting example method 100 of the present disclosure.

The present disclosure relates to thermoplastic polymer particles and melt emulsion extrusion methods of making such particles. Such particles, especially the highly spherical thermoplastic polymer particles, may be useful, among other things, as starting material for additive manufacturing.

More specifically, the thermoplastic polymer particles described herein are produced by extrusion emulsification methods where a thermoplastic polymer is dispersed as a melt in a carrier fluid that is immiscible with the thermoplastic polymer. A sufficient amount of shear is applied in an extruder to cause the thermoplastic polymer melt to form droplets in the carrier fluid. Emulsion stabilizers (e.g., like nanoparticles and/or surfactants) may be used to effect the surface tension at the phase interface between the carrier fluid and the thermoplastic polymer melt and consequently, effect the properties of the resultant thermoplastic polymer particles. The dispersion of thermoplastic polymer melt in the carrier fluid is cooled to solidify the thermoplastic polymer into particles. Advantageously, the emulsion extrusion processes described herein can be operated continuously, which provides a potentially scalable method for industrial-level production of highly spherical thermoplastic polymer particles with uniform sizes.

Without being limited by theory, during the melt emulsification process, the emulsion stabilizers primarily reside at the interface between the polymer melt and the carrier fluid. As a result, when the mixture is cooled, the emulsion stabilizers remain at said interface. Advantageously, the emulsion stabilizers at a surface of the resultant particles may assist with the flow properties of the resultant particles.

As described previously, traditional methods of forming thermoplastic polymer particles with good flowability include at least two steps including first forming (e.g., by cryogenic grinding or precipitation processes) and purifying the particles and second coating the particles to some degree with a flow enhancing agent like nanoparticle silica, carbon black, or PTFE particles. The methods described herein advantageously produce thermoplastic polymer particles with a coating that enhances flowability of the particles in one process.

Further, without limitation by theory, the methods of the present disclosure appear to produce particles with a more homogeneous coverage of emulsion stabilizers, which may further improve flowability. Enhanced flowability is especially advantageous in additive manufacturing applications like 3-D printing.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherences via hydrogen bonding and/or other mechanisms. However, chemical bonding may be occurring to some degree.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter at with 10% of the sample (on a volume basis, unless otherwise specified) is comprised of particles having a diameter less than said diameter value. As used herein, the term "D50" refers to a diameter at with 50% of the sample (on a volume basis, unless otherwise specified) is comprised of particles having a diameter less than said diameter value. As used herein, the term "D90" refers to a diameter at with 90% of the sample (on a volume basis, unless otherwise specified) is comprised of particles having a diameter less than said diameter value.

As used herein, the terms "diameter span" and "span" and "span size" when referring to diameter provides an indication of the breadth of the particle size distribution and is calculated as (D90−D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instruments software from a plot of volume density as a function of size.

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle.

As used herein, the term "sintering window" refers to the difference between the melting temperature (Tm) onset and the crystallization temperature (Tc) onset, or (Tm–Tc) onset. Tm, Tm (onset), Tc, and Tc (onset) are determined by differential scanning calorimetry per ASTM E794-06(2018) with a 10° C./min ramp rate and a 10° C./min cool rate.

As used herein, the term "extruder" refers to an apparatus having a barrel section with one or more screws or screw-like structures that convey material along the length of the barrel section. An extruder described herein does not necessarily include a die through which the material passes when exiting the barrel section or other portion of the extruder. Extruders may be single screw extruders, twin-screw extruders, or extruders that include more than two screws where screws may be co-rotating or counter-rotating. The extruder is not limited by the amount of material the extruder can process. For example, the extruder may be a laboratory (or batch) extruder or a larger, continuous extruder.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, the term "embed" relative to nanoparticles and a surface of a polymer particle refers to the nanoparticle being at least partially extending into the surface such that polymer is in contact with the nanoparticle to a greater degree than would be if the nanoparticle were simply laid on the surface of the polymer particle.

As used herein, viscosity of carrier fluids are the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

Thermoplastic Polymer Particles and Methods of Making

FIG. 1 is a flow chart of a nonlimiting example method 100 of the present disclosure. The thermoplastic polymer 102, carrier fluid 104, and optionally emulsion stabilizer 106 are combined 108 in an extruder to produce a mixture 110. The components 102, 104, and 106 can be added in any order and include mixing and/or heating during the process of combining 108 the components 102, 104, and 106.

The mixture 110 then passes 112 through the extruder where the screw applies sufficiently high shear to the mixture 110 at a temperature greater than the melting point or softening temperature of the thermoplastic polymer 102 to form a melt emulsion 114. Because the temperature is above the melting point or softening temperature of the thermoplastic polymer 102, the thermoplastic polymer 102 becomes a polymer melt. The shear rate should be sufficient enough to disperse the polymer melt in the carrier fluid 104 as droplets (i.e., the polymer emulsion 114). Without being limited by theory, it is believed that, all other factors being the same, increasing shear should decrease the size of the droplets of the polymer melt in the carrier fluid 104. However, at some point there may be diminishing returns on increasing shear and decreasing droplet size or may be disruptions to the droplet contents that decrease the quality of particles produced therefrom.

The melt emulsion 114 inside and/or outside the extruder is then cooled 116 to solidify the polymer droplets into thermoplastic polymer particles (also referred to as solidified thermoplastic polymer particles). The cooled mixture 118 can then be treated 120 to isolate the thermoplastic polymer particles 122 from other components 124 (e.g., the carrier fluid 104, excess emulsion stabilizer 106, and the like) and wash or otherwise purify the thermoplastic polymer particles 122. The thermoplastic polymer particles 122 comprise the thermoplastic polymer 102 and at least a portion of the emulsion stabilizer 106 coating the outer surface of the thermoplastic polymer particles 122. Emulsion stabilizers 106, or a portion thereof, may be deposited as a uniform coating on the thermoplastic polymer particles 122. In some instances, which may be dependent upon non-limiting factors such as the temperature (including cooling rate), the type of thermoplastic polymer 102, and the types and sizes of emulsion stabilizers 106, the nanoparticles of emulsion stabilizers 106 may become at least partially embedded within the outer surface of thermoplastic polymer particles 122 in the course of becoming associated therewith. Even without embedment taking place, at least the nanoparticles within emulsion stabilizers 106 may remain robustly associated with thermoplastic polymer particles 122 to facilitate their further use. In contrast, dry blending already formed thermoplastic polymer particulates (e.g., formed by cryogenic grinding or precipitation processes) with a flow aid like silica nanoparticles does not result in a robust, uniform coating of the flow aid upon the thermoplastic polymer particulates.

Advantageously, carrier fluids and washing solvents of the systems and methods described herein (e.g., method 101) can be recycled and reused. One skilled in the art will recognize any necessary cleaning of used carrier fluid and solvent necessary in the recycling process.

The thermoplastic polymer 102 and carrier fluid 104 should be chosen such that at the various processing temperatures (e.g., from room temperature to process temperature) the thermoplastic polymer 102 and carrier fluid 104 are immiscible. An additional factor that may be considered is the differences in (e.g., a difference or a ratio of) viscosity at process temperature between the molten thermoplastic polymer 102 and the carrier fluid 104. The differences in viscosity may affect droplet breakup and particle size distribution. Without being limited by theory, it is believed that when the viscosities of the molten thermoplastic polymer 102 and the carrier fluid 104 are too similar, the circularity of the product as a whole may be reduced where the particles are more ovular and more elongated structures are observed.

Examples of thermoplastic polymers 102 include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

The thermoplastic polymers 102 in the compositions and methods of the present disclosure may be elastomeric or non-elastomeric. Some of the foregoing examples of thermoplastic polymers 102 may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$ A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly [4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy thermoplastic polyester with one or more thermoplastic polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT' (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The thermoplastic polymers 102 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers 102 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymers 102 may optionally comprise an additive. Typically, the additive would be present before addition of the thermoplastic polymers 102 to the mixture 110. Therefore, in the thermoplastic polymer melt droplets and resultant thermoplastic polymer particles, the additive is dispersed throughout the thermoplastic polymer. Accordingly, for clarity, this additive is referred to herein as an "internal additive." The internal additive may be blended with the thermoplastic polymer just prior to making the mixture 110 or well in advance.

When describing component amounts in the compositions described herein (e.g., the mixture 110 and thermoplastic polymer particles 122), a weight percent based on the thermoplastic polymer 102 not inclusive of the internal additive. For example, a composition comprising 1 wt % of emulsion stabilizer by weight of 100 g of a thermoplastic polymer 102 comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer of the thermoplastic polymer 102. For example, the thermoplastic polymer 102 may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The thermoplastic polymer 102 may be present in the mixture 110 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the thermoplastic polymer 102 and carrier fluid 104 combined.

Suitable carrier fluids 104 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. The carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 110 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the thermoplastic polymer 102 and carrier fluid 104 combined.

In some instances, the carrier fluid 104 may have a density of about 0.6 g/cm$^3$ to about 1.5 g/cm$^3$, and the thermoplastic polymer 102 has a density of about 0.7 g/cm$^3$ to about 1.7 g/cm$^3$, wherein the thermoplastic polymer has a density similar, lower, or higher than the density of the carrier fluid.

The emulsion stabilizers used in the methods and compositions of the present disclosure may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

Nanoparticles may be included in the mixture 110 at a concentration of about 0.01 wt % to about 10 wt % (or about 0.05 wt % to about 1 wt %, or about 0.1 wt % to about 3 wt %, or about 1 wt % to about 5 wt %, or about 5 wt % to about 10 wt %) based on the weight of the thermoplastic polymer 102.

Surfactants may be anionic, cationic, nonionic, or zwitterionic. Examples of surfactants include, but are not limited to, sodium dodecyl sulfate, sorbitan oleates, poly [dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture 110 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 110 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added to the extruder in any order. In a first example, all components can be premixed, and optionally heated, then added to the extruder where sufficient shear and temperature are used to produce the melt droplets dispersed in the carrier fluid. Alternatively, each component can be added individually at different locations along the length of the extruder. In another example, the emulsion stabilizer 106 may first be dispersed in the carrier fluid 104, optionally with heating, and said dispersion and the thermoplastic polymer 102 can be added individually at different locations along the length of the extruder.

Figure 2:
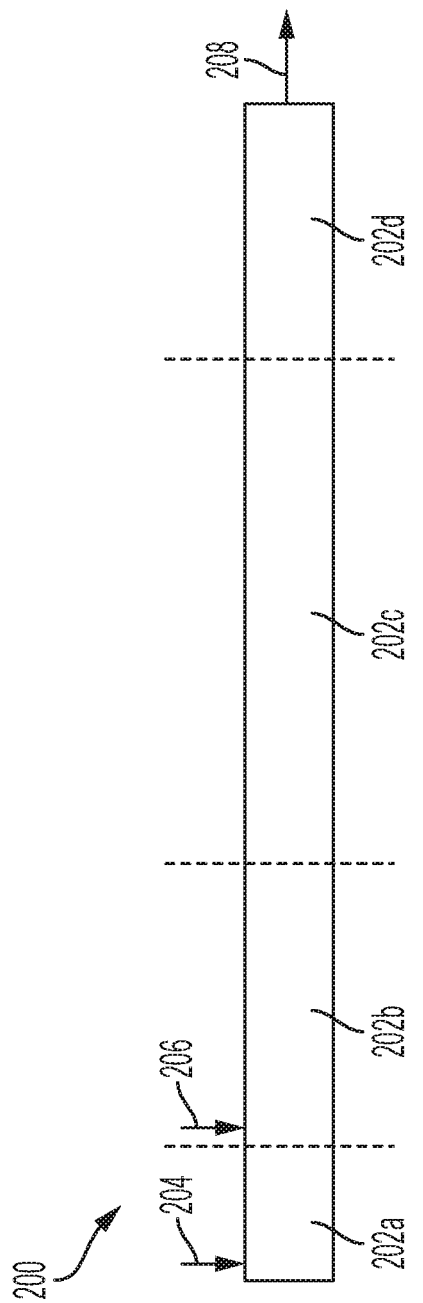
FIG. 2 is a nonlimiting example of an extruder configuration.

FIG. 2 is a nonlimiting example of an extruder configuration 200. In this example, the extruder configuration 200 includes four zones 202a-d. Each of these zones 202a-d differs from abutting zones in at least one characteristic. Said characteristics can include, but are not limited to, maximum temperature, minimum temperature, maximum shear rate, minimum shear rate, mass flow rate, and the like, and any combination thereof. For example, the screw design can vary along the length of the screw to achieve a desired shear rate in the zone.

In the illustrated example, the components 102, 104, and 106 can be added to the extruder at inlet 204 near the beginning of the first zone 202a and/or at inlet 206 near the beginning of the second zone 202b. The first and second zones 202*a-b* serve to combine 108 the components 102, 104, and 106. The third zone 202*c* illustrated is where the melt emulsification processing 112 occurs. Accordingly, in the third zone 202*c* the mixture 110 is at a temperature greater than the melting point or softening temperature of the thermoplastic polymer 102 and is subjected to a shear rate sufficiently high enough to disperse the thermoplastic polymer melt in the carrier fluid 104. The fourth zone 202*d*, in this example, cools the melt emulsion 114 to a temperature lower than in the third zone 202*c*. The temperature in the fourth zone 202*d* may be at, above, or below the melting point or softening temperature of the thermoplastic polymer 102. The melt emulsion 114 or cooled mixture 118 (depending on the degree of cooling in the fourth zone 202*d*) then exits the extruder via outlet 208. Additional cooling, as needed, can occur outside the extruder.

In the illustrated example, inlet 204 may be for adding the emulsion stabilizer 106 dispersed in the carrier fluid 104, and inlet 206 may be used for adding the thermoplastic polymer 102, or vice versa. Alternatively, inlet 204 may be for adding the thermoplastic polymer 102 and the carrier fluid 104, and inlet 206 may be used for adding the emulsion stabilizer 106. In yet another nonlimiting example, inlet 204 may be for adding a first portion of the thermoplastic polymer 102, the carrier fluid 104, and the emulsion stabilizer 106, and inlet 206 may be used for adding a first second of the thermoplastic polymer 102.

FIG. 2 is a nonlimiting example of an extruder configuration 200. Other extruder configurations can include any number of zones from 1 to 100 or more (or 1 to 10, or 2 to 15, or 3 to 20, or 5 to 20, or 10 to 50, or 25 to 75, or 50 to 100 or more). Further, other configurations can include any number of inlets from 1 to 10 or more (or 1 to 5, or 1 to 4, or 1 to 3). For example, for high thermoplastic polymer concentrations, the polymer may be added to the mixture in stages over two or more inlets.

Processing 112 and forming the melt emulsion 114 occur at suitable process conditions that may include, but are not limited to, temperature, shear rate, time, throughput, and the like, and any combination thereof.

The temperature of processing 112 and forming the melt emulsion 114 should be a temperature greater than the melting point or softening temperature of the thermoplastic polymer 102 and less than the decomposition temperature of any components 102, 104, and 106 in the mixture 110. For example, the temperature of processing 112 and forming the melt emulsion 114 may be about 1° C. to about 50° C. (or about 1° C. to about 25° C., or about 5° C. to about 30° C., or about 20° C. to about 50° C.) greater than the melting point or softening temperature of the thermoplastic polymer 102 provided the temperature of processing 112 and forming the melt emulsion 114 is less than the decomposition temperature of any components 102, 104, and 106 in the mixture 110.

The shear rate of processing 112 and forming the melt emulsion 114 should be sufficiently high to disperse the polymer melt in the carrier fluid 104 as droplets. Said droplets should comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The residence time for the mixture in the zone(s) at processing 112 temperature and shear rate for forming the melt emulsion 114 may be 10 seconds to 1 hour or longer (or 10 seconds to 5 minutes, or 30 seconds to 3 minutes, or 1 minute to 15 minutes, or 10 minutes to 45 minutes, or 30 hours to 1 hour).

The melt emulsion 114 may then be cooled 116 inside and/or outside the extruder. Cooling 116 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 114. In some instances, the shear applied during heating may be applied during cooling.

The cooled mixture 118 resulting from cooling 116 the melt emulsion 114 comprises solidified thermoplastic polymer particles 122 (or simply thermoplastic polymer particles) and other components 124 (e.g., the carrier fluid 104, excess emulsion stabilizer 106, and the like). The thermoplastic polymer particles may be dispersed in the carrier fluid or settled in the carrier fluid.

The cooled mixture 118 may then be treated 120 to the separate thermoplastic polymer particles 122 (or simply thermoplastic polymer particles 122) from the other components 124. Suitable treatments include, but are not limited to, washing, filtering, centrifuging, decanting, and the like, and any combination thereof.

Solvents used for washing the thermoplastic polymer particles 122 should generally be (a) miscible with the carrier fluid 104 and (b) nonreactive (e.g., non-swelling and non-dissolving) with the thermoplastic polymer 102. The choice of solvent will depend on, among other things, the composition of the carrier fluid and the composition of the thermoplastic polymer 102.

Examples of solvents include, but are not limited to, aromatic hydrocarbons (e.g., toluene and/or xylene), aliphatic hydrocarbons (e.g., heptane, n-hexane, and/or n-octane), alicyclic hydrocarbons (e.g., cyclohexane, cyclooctane), halogenated hydrocarbons (e.g., trichloro-ethane), alcohols (e.g., isopropyl alcohol), ketones (e.g., methyl ethyl ketone); esters (e.g., ethyl acetate), and the like, and any combination thereof.

Solvent may be removed from the thermoplastic polymer particles 122 by drying using an appropriate method such as air-drying, heat-drying, reduced pressure drying, freeze drying, or a hybrid thereof. The heating may be performed preferably at a temperature lower than the glass transition point of the thermoplastic polymer (e.g., about 50° C. to about 150° C.).

The thermoplastic polymer particles 122 after separation from the other components 124 may optionally be further classified to produce purified thermoplastic polymer particles 128. For example, to narrow the particle size distribution (or reduce the diameter span), the thermoplastic polymer particles 122 can be passed through a sieve having a pore size of about 10 µm to about 250 µm (or about 10 µm to about 100 µm, or about 50 µm to about 200 µm, or about 150 µm to about 250 µm).

In another example purification technique, the thermoplastic polymer particles 122 may be washed with water to remove surfactant while maintaining substantially all of the nanoparticles associated with the surface of the thermoplastic polymer particles 122. In yet another example purification technique, the thermoplastic polymer particles 122 may be blended with additives to achieve a desired final product. For clarity, because such additives are blended with the thermoplastic particles 122 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the thermoplastic polymer particles 122 may be unwanted in downstream applications. Accordingly, yet another example purification technique may include at least substantial removal of the surfactant from the thermoplastic polymer particles 122 (e.g., by washing and/or pyrolysis).

The thermoplastic polymer particles 122 and/or purified thermoplastic polymer particles 128 (referred to as particles 122/128) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 122/128 is, in general, includes emulsion stabilizers (a) dispersed on an outer surface of the particles 122/128 and/or (b) embedded in an outer portion (e.g., outer 1 vol %) of the particles 122/128.

Further, where voids form inside the polymer melt droplets, emulsion stabilizers 106 should generally be at (and/or embedded in) the interface between the interior of the void and the thermoplastic polymer. The voids generally do not contain the thermoplastic polymer. Rather, the voids may contain, for example, carrier fluid, air, or be void. The particles 122/128 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 122/128.

The thermoplastic polymer 102 may be present in the particles 122/128 at about 90 wt % to about 99.5 wt % (or about 90 wt % to about 95 wt %, or about 92 wt % to about 97 wt %, or about 95 wt % to about 99.5 wt %) of the particles 122/128.

The emulsion stabilizers 106 may be present in the particles 122/128 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 122/128. When purified to at least substantially remove surfactant or another emulsion stabilizer, the emulsion stabilizers 106 may be present in the particles 128 at less than 0.01 wt % (or 0 wt % to about 0.01 wt %, or 0 wt % to 0.001 wt %).

Upon forming thermoplastic particulates according to the disclosure herein, at least a portion of the nanoparticles, such as silica nanoparticles, may be disposed as a coating upon the outer surface of the thermoplastic particulates. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs.

The particles 122/128 may have a D10 of about 0.1 µm to about 125 µm (or about 0.1 µm to about 5 µm, about 1 µm to about 10 µm, about 5 µm to about 30 µm, or about 1 µm to about 25 µm, or about 25 µm to about 75 µm, or about 50 µm to about 85 µm, or about 75 µm to about 125 µm), a D50 of about 0.5 µm to about 200 µm (or about 0.5 µm to about 10 µm, or about 5 µm to about 50 µm, or about 30 µm to about 100 µm, or about 30 µm to about 70 µm, or about 25 µm to about 50 µm, or about 50 µm to about 100 µm, or about 75 µm to about 150 µm, or about 100 µm to about 200 µm), and a D90 of about 3 µm to about 300 µm (or about 3 µm to about 15 µm, or about 10 µm to about 50 µm, or about 25 µm to about 75 µm, or about 70 µm to about 200 µm, or about 60 µm to about 150 µm, or about 150 µm to about 300 µm), wherein D10<D50<D90. The particles 122/128 may also have a diameter span of about 0.2 to about 10 (or about 0.2 to about 0.5, or about 0.4 to about 0.8, or about 0.5 to about 1.0, or about 1 to about 3, or about 2 to about 5, or about 5 to about 10). Without limitation, diameter span values of 1.0 or greater are considered broad, and diameter spans values of 0.75 or less are considered narrow. Without limitation, diameter span values of 1.0 or greater are considered broad, and diameter spans values of 0.75 or less are considered narrow.

In a first nonlimiting example, the particles 122/128 may have a D10 of about 0.1 µm to about 10 µm, a D50 of about 0.5 µm to about 25 µm, and a D90 of about 3 µm to about 50 µm, wherein D10<D50<D90. Said particles 122/128 may have a diameter span of about 0.2 to about 2.

In a second nonlimiting example, the particles 122/128 may have a D10 of about 5 µm to about 30 µm, a D50 of about 30 µm to about 70 µm, and a D90 of about 70 µm to about 120 µm, wherein D10<D50<D90. Said particles 122/128 may have a diameter span of about 1.0 to about 2.5.

In a third nonlimiting example, the particles 122/128 may have a D10 of about 25 µm to about 60 µm, a D50 of about 60 µm to about 110 µm, and a D90 of about 110 µm to about 175 µm, wherein D10<D50<D90. Said particles 122/128 may have a diameter span of about 0.6 to about 1.5.

In a fourth nonlimiting example, the particles 122/128 may have a D10 of about 75 µm to about 125 µm, a D50 of about 100 µm to about 200 µm, and a D90 of about 125 µm to about 300 µm, wherein D10<D50<D90. Said particles 122/128 may have a diameter span of about 0.2 to about 1.2.

In a fifth nonlimiting example, the particles 122/128 may have a D10 of about 1 µm to about 50 µm (or about 5 µm to about 30 µm, or about 1 µm to about 25 µm, or about 25 µm to about 50 µm), a D50 of about 25 µm to about 100 µm (or about 30 µm to about 100 µm, or about 30 µm to about 70 µm, or about 25 µm to about 50 µm, or about 50 µm to about 100 µm), and a D90 of about 60 µm to about 300 µm (or about 70 µm to about 200 µm, or about 60 µm to about 150 µm, or about 150 µm to about 300 µm), wherein D10<D50<D90. The particles 122/128 may also have a diameter span of about 0.4 to about 3 (or about 0.6 to about 2, or about 0.4 to about 1.5, or about 1 to about 3).

The particles 122/128 may have a circularity of about 0.9 or greater (or about 0.90 to about 1.0, or about 0.93 to about 0.99, or about 0.95 to about 0.99, or about 0.97 to about 0.99, or about 0.98 to 1.0).

The particles 122/128 may have an angle of repose of about 20° to about 45° (or about 25° to about 35°, or about 30° to about 40°, or about 35° to about 45°).

The particles 122/128 may have a Hausner ratio of about 1.0 to about 1.5 (or about 1.0 to about 1.2, or about 1.1 to about 1.3, or about 1.2 to about 1.35, or about 1.3 to about 1.5).

The particles 122/128 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 112 and the composition and relative concentrations of the components 102, 104, and 106, different shapes of the structures that compose the particles 122/128 have been observed. Typically, the particles 122/128 comprise substantially spherical particles (having a circularity of about 0.97 or greater). However, other structures included disc and elongated structures have been observed in the particles 122/128. Therefore, the particles 122/128 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 122/128 may have a sintering window that is within 10° C., preferably within 5° C., of the sintering window of the thermoplastic polymer 102 (comprising one or more PP-polyamides and optionally one or more other thermoplastic polymers).

Applications of Thermoplastic Polymer Particles

The thermoplastic polymer particles described herein may be utilized in 3-D print processes, particularly those employing selective laser sintering to promote particulate consolidation. The thermoplastic polymer particles of the present disclosure may exhibit advantageous properties over polymer particulates having irregular shapes or wider particulate distributions, such as those available commercially. In nonlimiting examples, the thermoplastic polymer particles of the present disclosure may undergo consolidation at lower laser powers and afford a decreased extent of void formation in an object produced by 3-D printing.

3-D printing processes of the present disclosure may comprise: depositing thermoplastic polymer particles of the present disclosure upon a surface in a specified shape, and once deposited, heating at least a portion of the thermoplastic polymer particles to promote consolidation thereof and form a consolidated body (object), such that the consolidated body has a void percentage of about 1% or less after being consolidated. For example, heating and consolidation of the thermoplastic polymer particles may take place in a 3-D printing apparatus employing a laser, such that heating and consolidation take place by selective laser sintering.

Any of the thermoplastic polymer particles disclosed herein may be formulated in a composition suitable for 3-D printing. Choice of the composition and type of elastomeric particulate may be based upon various factors such as, but not limited to, the laser power used for selective laser sinter, the type of object being produced, and the intended use conditions for the object.

Examples of objects that may be 3-D printed using the thermoplastic polymer particles of the present disclosure include, but are not limited to, containers (e.g., for food, beverages, cosmetics, personal care compositions, medicine, and the like), shoe soles, toys, furniture parts and decorative home goods, plastic gears, screws, nuts, bolts, cable ties, automotive parts, medical items, prosthetics, orthopedic implants, aerospace/aircraft-related parts, production of artifacts that aid learning in education, 3D anatomy models to aid in surgeries, robotics, biomedical devices (orthotics), home appliances, dentistry, electronics, sporting goods, and the like.

Other applications for the thermoplastic particulates of the present disclosure may include, but are not limited to, use as a filler in paints and powder coatings, inkjet materials and electrophotographic toners, and the like. In some instances, the thermoplastic particulates may have other preferred characteristics like diameter and span to be useful in said other applications.

Nonlimiting Example Embodiments

A first nonlimiting example of the present disclosure is a method comprising: mixing in an extruder a mixture comprising a thermoplastic polymer (e.g., a thermoplastic elastomer) and a carrier fluid that is immiscible with the thermoplastic polymer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising thermoplastic polymer particles having a circularity of 0.90 or greater and that comprise the thermoplastic polymer; and separating the solidified particles from the carrier fluid. The first nonlimiting example method may also include one or more of: Element 1: wherein the mixture further comprises nanoparticles, and wherein the solidified particles further comprise the thermoplastic polymer and the nanoparticles associated with an outer surface of the solidified particles; Element 2: Element 1 and wherein at least some of the nanoparticles are embedded in the outer surface of the solidified particles; Element 3: Element 1 and wherein at least some of the solidified particles have a void comprising the nanoparticles at a void/thermoplastic polymer interface; Element 4: Element 3 and wherein the nanoparticles are embedded in the void/thermoplastic polymer interface; Element 5: Element 3 and wherein the void contains the carrier fluid; Element 6: Element 1 and wherein the nanoparticles form a coating that covers less than 5% of the surface of the solidified particles; Element 7: Element 1 and wherein the nanoparticles form a coating that covers at least 5% of the surface of the solidified particles; Element 8: wherein the nanoparticles form a coating that covers at least 25% of the surface of the solidified particles; Element 9: Element 1 and wherein the nanoparticles form a coating that covers at least 50% of the surface of the solidified particles; Element 10: Element 1 and wherein the solidified particles further comprises elongated structures on the surface of the solidified particles, wherein the elongated structures comprises the thermoplastic polymer with the nanoparticles associated with an outer surface of the elongated structures; Element 11: Element 1 and wherein the nanoparticles are present in the mixture at 0.01 wt % to 10 wt % by weight of the thermoplastic polymer; Element 12: Element 1 and wherein the nanoparticles have an average diameter of 1 nm to 500 nm; Element 13: Element 1 and wherein the nanoparticles have a BET surface area of 10 $m^2/g$ to 500 $m^2/g$; Element 14: wherein at least some of the thermoplastic polymer particles have a void comprising the carrier fluid; Element 15: wherein the thermoplastic polymer is present the mixture at 5 wt % to 60 wt % of the mixture; Element 16: wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof; Element 17: wherein the melting point or softening temperature of the thermoplastic polymer is 50° C. to 450° C.; Element 18: wherein the carrier fluid is selected from the group consisting of: silicone oil, fluorinated silicone oils, perfluorinated silicone oils, polyethylene glycols, alkyl-terminal polyethylene glycol, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof; Element 19: Element 18 and wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof; Element 20: wherein the carrier fluid has a viscosity at 25° C. of 1,000 cSt to 150,000 cSt; Element 21: wherein the carrier fluid has a density of 0.6 $g/cm^3$ to 1.5 $g/cm^3$, wherein the thermoplastic polymer has a density of 0.7 $g/cm^3$ to 1.7 $g/cm^3$; Element 22: wherein the mixture further comprises a surfactant; Element 23: wherein the solidified particles have a D10 of about 0.5 μm to about 125 μm, a D50 of about 1 μm to about 200 μm, and a D90 of about 70 μm to about 300 μm, wherein D10<D50<D90; Element 24: wherein the solidified particles have a diameter span of about 0.2 to about 10; Element 25: wherein the solidified particles have a D10 of about 5 μm to about 30 μm, a D50 of about 30 μm to about 70 μm, and a D90 of about 70 μm to about 120 μm, wherein D10<D50<D90; Element 26: Element 25 and wherein the solidified particles have a diameter span of about 1.0 to about 2.5; Element 27: wherein the solidified particles have a D10 of about 25 μm to about 60 μm, a D50 of about 60 μm to about 110 μm, and a D90 of about 110 μm to about 175 μm, wherein D10<D50<D90; Element 28: Element 27 and wherein the solidified particles have a diameter span of about 0.6 to about 1.5; Element 29: wherein the solidified particles have a D10 of about 75 μm to about 125 μm, a D50 of about 100 μm to about 200 μm, and a D90 of about 125 μm to about 300 μm, wherein D10<D50<D90; Element 30: Element 29 and wherein the solidified particles have a diameter span of about 0.2 to about 1.2; Element 31: wherein the solidified particles have a circularity of about 0.97 to about 1.0; Element 32: wherein the solidified particles have a Hausner ratio of about 1.0 to about 1.5; Element 33: wherein the nanoparticles comprise oxide nanoparticles; Element 34: wherein the nanoparticles comprise carbon black; and Element 35: wherein the nanoparticles comprise polymer nanoparticles. Examples of combinations include, but are not limited to, Elements 1, 3, 4, and 5 in combination; Element 1 in combination with two or more of Elements 2-13; Element 1 in combination with one or more of Elements 14-35; Element 1 in combination with one or more of Elements 2-13 and in further combination with one or more of Elements 14-35; two or more of Elements 14-35 in combination; and Elements 33-35 in combination.

A second nonlimiting example of the present disclosure is a composition comprising: particles comprising thermoplastic polymer particles (e.g., thermoplastic elastomer particles) having a circularity of 0.90 or greater. The second nonlimiting example composition may also include one or more of: Element 1; Element 2; Element 3; Element 4; Element 5; Element 6; Element 7; Element 8; Element 9; Element 10; Element 11; Element 12; Element 13; Element 14; Element 16; Element 17; Element 23; Element 24; Element 25; Element 26; Element 27; Element 28; Element 29; Element 30; Element 31; Element 32; Element 33; Element 34; Element 35; Element 36: wherein the thermoplastic polymer is present at 90 wt % to 99.5 wt % of the particle; and Element 37: wherein the particles further comprise surfactant associated with the an outer surface of the particles. Further, Element 5 or 14 (alone or in the following combinations) may be in further combination with one or more of Elements 18, 19, 20, and 21. Examples of combinations include, but are not limited to, the combinations provided for in the first nonlimiting example; Element 36 and 37 in combination; Element 36 and/or Element 37 in combination with Element 1 and optionally in further combination with one or more of Elements 2-13; Element 36 and/or Element 37 in combination with one or more of Elements 23-35 and optionally in further combination with one or more of Elements 1-13; and Element 36 and/or Element 37 in combination with Element 16 and/or Element 17.

Clauses

Clause 1. A method comprising: mixing in an extruder a mixture comprising a thermoplastic polymer (e.g., a thermoplastic elastomer) and a carrier fluid that is immiscible with the thermoplastic polymer at a temperature greater than a melting point or softening temperature of the thermoplastic polymer and at a shear rate sufficiently high to disperse the thermoplastic polymer in the carrier fluid; cooling the mixture to below the melting point or softening temperature of the thermoplastic polymer to form solidified particles comprising thermoplastic polymer particles having a circularity of 0.90 or greater and that comprise the thermoplastic polymer; and separating the solidified particles from the carrier fluid.

Clause 2. The method of Clause 1, wherein the mixture further comprises an emulsion stabilizer (e.g., nanoparticles and/or surfactant), and wherein the solidified particles further comprise the nanoparticles associated with an outer surface of the solidified particles.

Clause 3. The method of Clause 2, wherein the emulsion stabilizers comprise nanoparticles and at least some of the nanoparticles are embedded in the outer surface of the solidified particles.

Clause 4. The method of Clause 2, wherein at least some of the solidified particles have a void comprising the nanoparticles at a void/thermoplastic polymer interface.

Clause 5. The method of Clause 4, wherein the nanoparticles are embedded in the void/thermoplastic polymer interface.

Clause 6. The method of Clause 4, wherein the void contains the carrier fluid.

Clause 7. The method of Clause 2, wherein the emulsion stabilizer forms a coating that covers less than 5% of the surface of the solidified particles.

Clause 8. The method of Clause 2, wherein the emulsion stabilizer forms a coating that covers at least 5% of the surface of the solidified particles.

Clause 9. The method of Clause 2, wherein the emulsion stabilizer forms a coating that covers at least 25% of the surface of the solidified particles.

Clause 10. The method of Clause 2, wherein the emulsion stabilizer forms a coating that covers at least 50% of the surface of the solidified particles.

Clause 11. The method of Clause 2, wherein the solidified particles further comprises elongated structures on the surface of the solidified particles, wherein the elongated structures comprises the thermoplastic polymer with the emulsion stabilizer associated with an outer surface of the elongated structures.

Clause 12. The method of Clause 2, wherein the emulsion stabilizer is present in the mixture at 0.01 wt % to 10 wt % by weight of the thermoplastic polymer.

Clause 13. The method of Clause 2, wherein the nanoparticles have an average diameter of 1 nm to 500 nm.

Clause 14. The method of Clause 2, wherein the nanoparticles have a BET surface area of 10 $m^2$/g to 500 $m^2$/g.

Clause 15. The method of Clause 2, wherein the nanoparticles comprise oxide nanoparticles.

Clause 16. The method of Clause 2, wherein the nanoparticles comprise carbon black.

Clause 17. The method of Clause 2, wherein the nanoparticles comprise polymer nanoparticles.

Clause 18. The method of Clause 1, wherein at least some of the thermoplastic polymer particles have a void comprising the carrier fluid.

Clause 19. The method of Clause 1, wherein the thermoplastic polymer is present the mixture at 5 wt % to 60 wt % of the mixture.

Clause 20. The method of claim 1, wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or non-functionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Clause 21. The method of Clause 1, wherein the melting point or softening temperature of the thermoplastic polymer is 50° C. to 450° C.

Clause 22. The method of Clause 1, wherein the carrier fluid is selected from the group consisting of: silicone oil, fluorinated silicone oils, perfluorinated silicone oils, polyethylene glycols, alkyl-terminal polyethylene glycol, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 23. The method of Clause 22, wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof.

Clause 24. The method of Clause 1, wherein the carrier fluid has a viscosity at 25° C. of 1,000 cSt to 150,000 cSt.

Clause 25. The method of Clause 1, wherein the carrier fluid has a density of 0.6 g/cm$^3$ to 1.5 g/cm$^3$, wherein the thermoplastic polymer has a density of 0.7 g/cm$^3$ to 1.7 g/cm$^3$.

Clause 26. The method of Clause 1, wherein the mixture further comprises an emulsion stabilizer (e.g., nanoparticles and/or surfactant).

Clause 27. The method of Clause 1, wherein the solidified particles have a D10 of about 0.5 µm to about 125 µm, a D50 of about 1 µm to about 200 µm, and a D90 of about 70 µm to about 300 µm, wherein D10<D50<D90.

Clause 28. The method of Clause 1, wherein the solidified particles have a diameter span of about 0.2 to about 10.

Clause 29. The method of Clause 1, wherein the solidified particles have a D10 of about 5 µm to about 30 µm, a D50 of about 30 µm to about 70 µm, and a D90 of about 70 µm to about 120 µm, wherein D10<D50<D90.

Clause 30. The method of Clause 29, wherein the solidified particles have a diameter span of about 1.0 to about 2.5.

Clause 31. The method of Clause 1, wherein the solidified particles have a D10 of about 25 µm to about 60 µm, a D50 of about 60 µm to about 110 µm, and a D90 of about 110 µm to about 175 µm, wherein D10<D50<D90.

Clause 32. The method of Clause 31, wherein the solidified particles have a diameter span of about 0.6 to about 1.5.

Clause 33. The method of Clause 1, wherein the solidified particles have a D10 of about 75 µm to about 125 µm, a D50 of about 100 µm to about 200 µm, and a D90 of about 125 µm to about 300 µm, wherein D10<D50<D90.

Clause 34. The method of Clause 33, wherein the solidified particles have a diameter span of about 0.2 to about 1.2.

Clause 35. The method of Clause 1, wherein the solidified particles have a circularity of about 0.97 to about 1.0.

Clause 36. The method of Clause 1, wherein the solidified particles have a Hausner ratio of about 1.0 to about 1.5.

Clause 37. The method of Clause 1, wherein the thermoplastic polymer comprises a thermoplastic elastomer.

Clause 38. The method of Clause 1, wherein the thermoplastic polymer is a thermoplastic elastomer.

Clause 39. A composition comprising: particles comprising thermoplastic polymer particles (e.g., thermoplastic elastomer particles) having a circularity of 0.90 or greater.

Clause 40. The composition of Clause 39, wherein the particles further comprise an emulsion stabilizer (e.g., nanoparticles and/or surfactant) associated with an outer surface of the thermoplastic polymer particles.

Clause 41. The composition of Clause 40, wherein the emulsion stabilizer comprises nanoparticles and at least some of the nanoparticles are embedded in the outer surface of the particles.

Clause 42. The composition of Clause 40, wherein at least some of the particles have a void comprising the nanoparticles at a void/thermoplastic polymer interface.

Clause 43. The composition of Clause 42, wherein the nanoparticles are embedded in the void/thermoplastic polymer interface.

Clause 44. The composition of Clause 42, wherein the void contains a carrier fluid having a viscosity at 25° C. of 1,000 cSt to 150,000 cSt.

Clause 45. The composition of Clause 40, wherein the particles further comprise elongated structures that comprise the thermoplastic polymer with the emulsion stabilizer associated with an outer surface of the elongated structures.

Clause 46. The composition of Clause 40, wherein the emulsion stabilizer forms a coating that covers at least 5% of the surface of the particles.

Clause 47. The composition of Clause 40, wherein the emulsion stabilizer forms a coating that covers at least 25% of the surface of the particles.

Clause 48. The composition of Clause 40, wherein the emulsion stabilizer forms a coating that covers at least 50% of the surface of the particles.

Clause 49. The composition of Clause 40, wherein the nanoparticles have an average diameter of 1 nm to 500 nm.

Clause 50. The composition of Clause 40, wherein the nanoparticles have a BET surface area of 10 m$^2$/g to 500 m$^2$/g.

Clause 51. The composition of Clause 40, wherein the nanoparticles comprise oxide nanoparticles.

Clause 52. The composition of Clause 40, wherein the nanoparticles comprise carbon black.

Clause 53. The composition of Clause 40, wherein the nanoparticles comprise polymer nanoparticles.

Clause 54. The composition of Clause 39, wherein the thermoplastic polymer is present at 90 wt % to 99.5 wt % of the particle.

Clause 55. The composition of Clause 39, wherein the thermoplastic polymer is selected from the group consisting of: polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or non-functionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

Clause 56. The composition of Clause 39, wherein the melting point or softening temperature of the thermoplastic polymer is 50° C. to 450° C.

Clause 57. The composition of Clause 39, wherein the particles have a D10 of about 0.5 µm to about 125 µm, a D50 of about 1 µm to about 200 µm, and a D90 of about 70 µm to about 300 µm, wherein D10<D50<D90.

Clause 58. The composition of Clause 57, wherein the particles have a diameter span of about 0.2 to about 10.

Clause 59. The composition of Clause 39, wherein the particles have a D10 of about 5 µm to about 30 µm, a D50 of about 30 µm to about 70 µm, and a D90 of about 70 µm to about 120 µm, wherein D10<D50<D90.

Clause 60. The composition of Clause 59, wherein the particles have a diameter span of about 1.0 to about 2.5.

Clause 61. The composition of Clause 39, wherein the particles have a D10 of about 25 μm to about 60 μm, a D50 of about 60 μm to about 110 μm, and a D90 of about 110 μm to about 175 μm, wherein D10<D50<D90.

Clause 62. The composition of Clause 61, wherein the particles have a diameter span of about 0.6 to about 1.5.

Clause 63. The composition of Clause 39, wherein the particles have a D10 of about 75 μm to about 125 μm, a D50 of about 100 μm to about 200 μm, and a D90 of about 125 μm to about 300 μm, wherein D10<D50<D90.

Clause 64. The composition of Clause 63, wherein the solidified particles have a diameter span of about 0.2 to about 1.2.

Clause 65. The composition of Clause 39, wherein the particles have a circularity of about 0.97 to about 1.0.

Clause 66. The composition of Clause 39, wherein the particles have a Hausner ratio of about 1.0 to about 1.5.

Clause 67. The composition of Clause 39, wherein the thermoplastic polymer comprises a thermoplastic elastomer.

Clause 68. The composition of Clause 39, wherein the thermoplastic polymer is a thermoplastic elastomer.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. Polyamide 6 microparticles were produced in a Haake small-scale double screw extruder with high shear rotors. The carrier fluid was PDMS oil of either 30,000 cSt or 60,000 cSt viscosity at room temperature. The concentrations of components in the final mixture in the extruder are provided in Table 1. The order of addition of components to the extruder were either (a) the carrier fluid was added to the extruder, brought to temperature, and then room temperature polymer pellets added to the heated carrier fluid in the extruder or (b) where the polymer pellets were added to the extruder, brought to temperature, and then room temperature carrier fluid added to the molten polymer in the extruder. At temperature (see Table 1), the extruder was operated at 200 rpm for 30 minutes. Then, the mixture was discharged from the extruder onto a cold surface to provide rapid quench cooling. During heating, at temperature, and cooling, the torque of the extruder system was measured with no significant torque detected.

TABLE 1

| Sample | 1-1 | 1-2 | 1-3 | 1-4 | 1-5 | 1-6 | 1-7 | 1-8 | 1-9 |
|---|---|---|---|---|---|---|---|---|---|
| wt % polymer | 20 | 20 | 20 | 20 | 35 | 35 | 35 | 35 | 50 |
| carrier fluid visc. (cSt) | 30,000 | 30,000 | 60,000 | 60,000 | 60,000 | 30,000 | 30,000 | 60,000 | 30,000 |
| wt % carrier fluid | 80 | 80 | 80 | 80 | 65 | 65 | 65 | 65 | 50 |
| set temp. (° C.) | 220 | 230 | 220 | 230 | 230 | 230 | 220 | 220 | 225 |
| actual temp. (° C.) | 227 | 236 | 227 | 236 | 236 | 236 | 227 | 227 | 232 |
| order of addition | (a) | (a) | (a) | (a) | (a) | (a) | (a) | (a) | (b) |

The resultant mixture was then filtered through a 90 mm WHATMAN® #1 paper filter (available from SigmaAldrich) to separate the polyamide 6 particles from the carrier fluid. The particles were washed three times with 300 mL of ethyl acetate. The particles were then allowed to air dry overnight in an aluminum pan in a fume hood.

The polyamide 6 particles were then characterized for size with a Malvern MASTERSIZER™ 3000 and morphology with SEM micrographs.

TABLE 2

Figure 3:
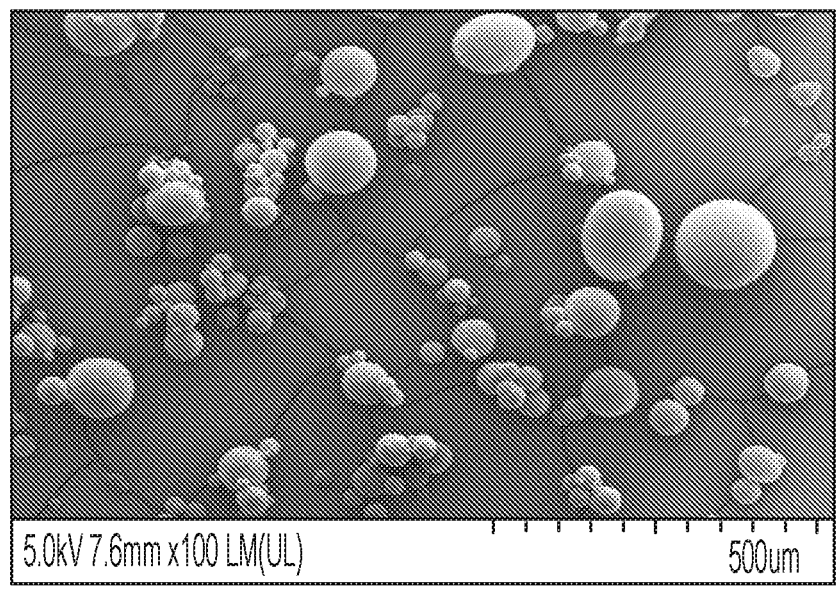
FIG. 3 is a scanning electron micrograph of polyamide particles.
Figure 4:
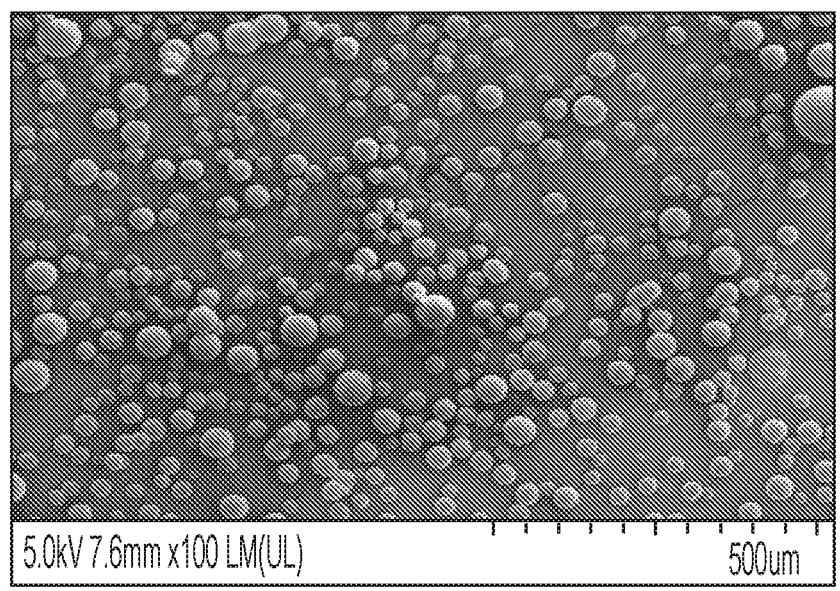
FIG. 4 is a scanning electron micrograph of polyamide particles.

| Sample | D50 (μm) | Diameter Span | SEM Micrograph |
|---|---|---|---|
| 1-1 | 64 | 1.35 | FIG. 3 |
| 1-2 | 35 | 1.33 | FIG. 4 |

TABLE 2-continued

Figure 5:
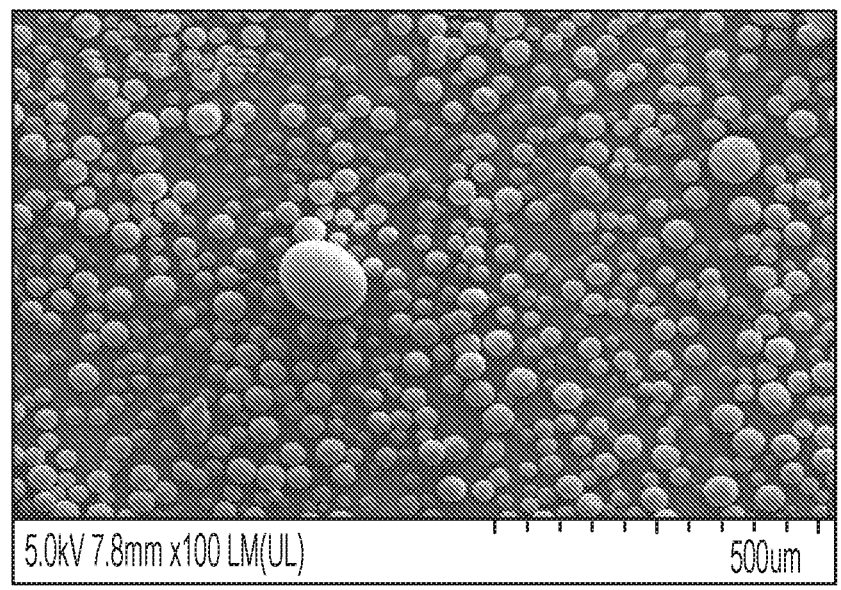
FIG. 5 is a scanning electron micrograph of polyamide particles.
Figure 6:
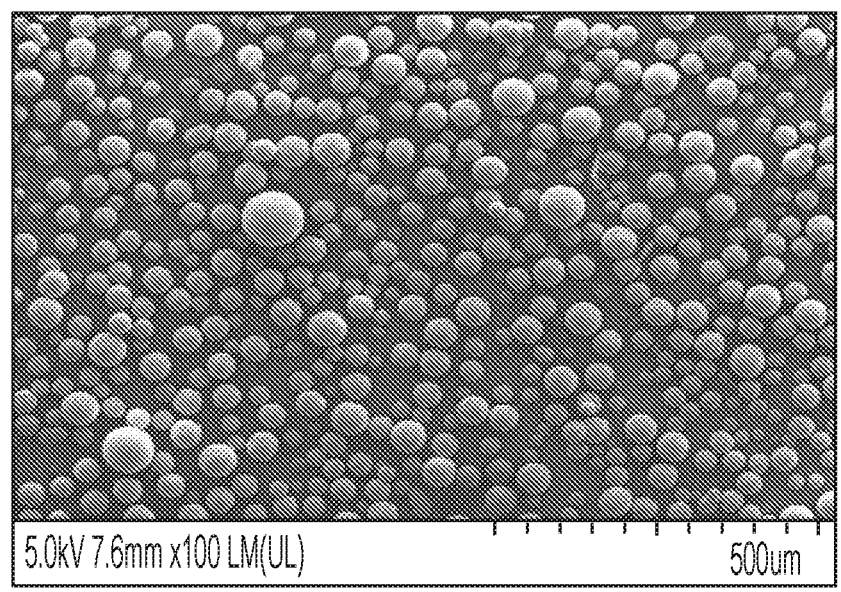
FIG. 6 is a scanning electron micrograph of polyamide particles.
Figure 7:
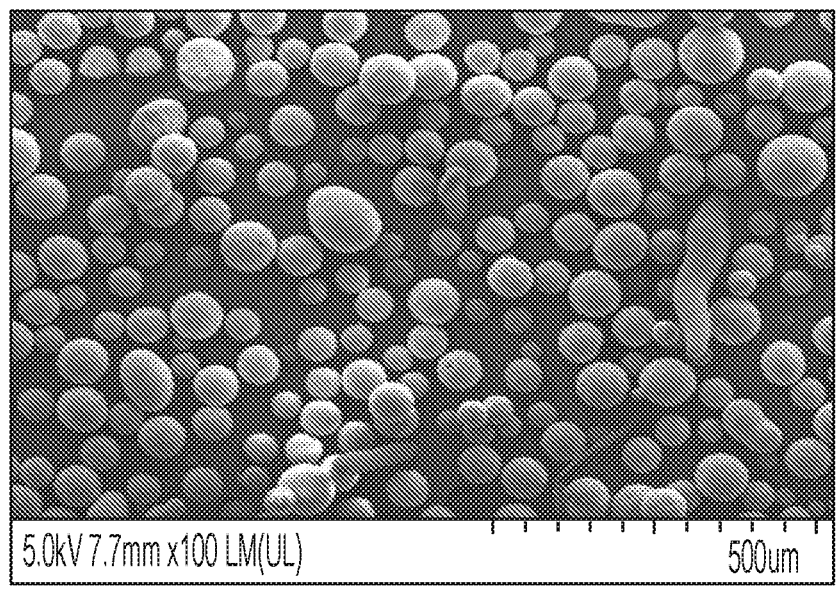
FIG. 7 is a scanning electron micrograph of polyamide particles.
Figure 8:
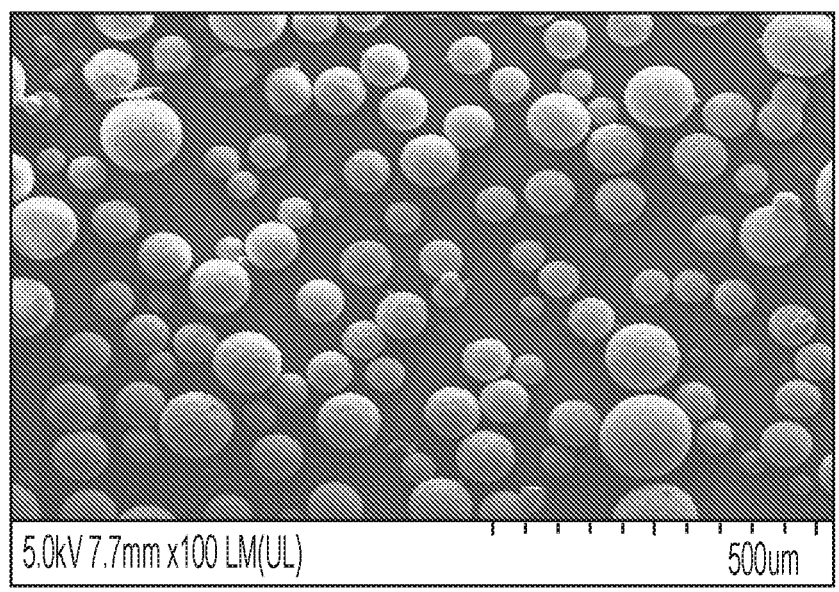
FIG. 8 is a scanning electron micrograph of polyamide particles.
Figure 9:
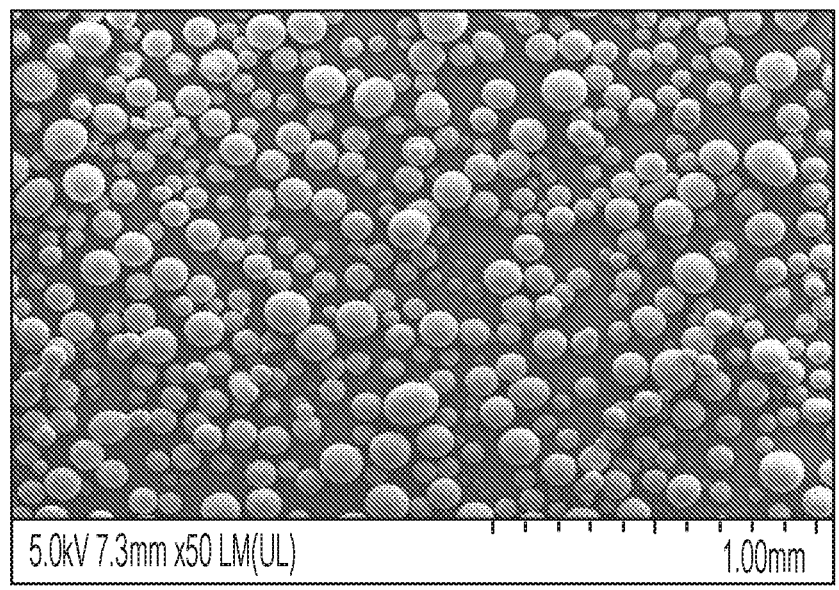
FIG. 9 is a scanning electron micrograph of polyamide particles.
Figure 10:
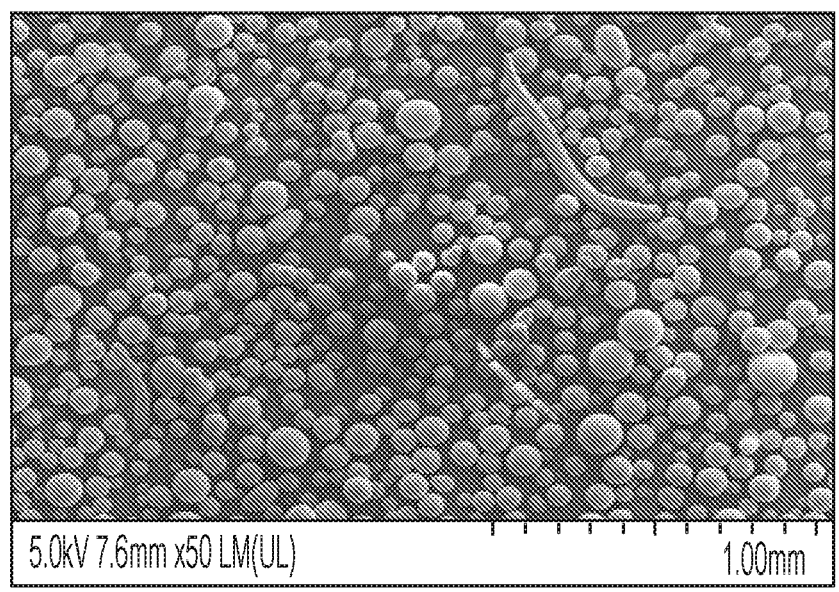
FIG. 10 is a scanning electron micrograph of polyamide particles.
Figure 11:
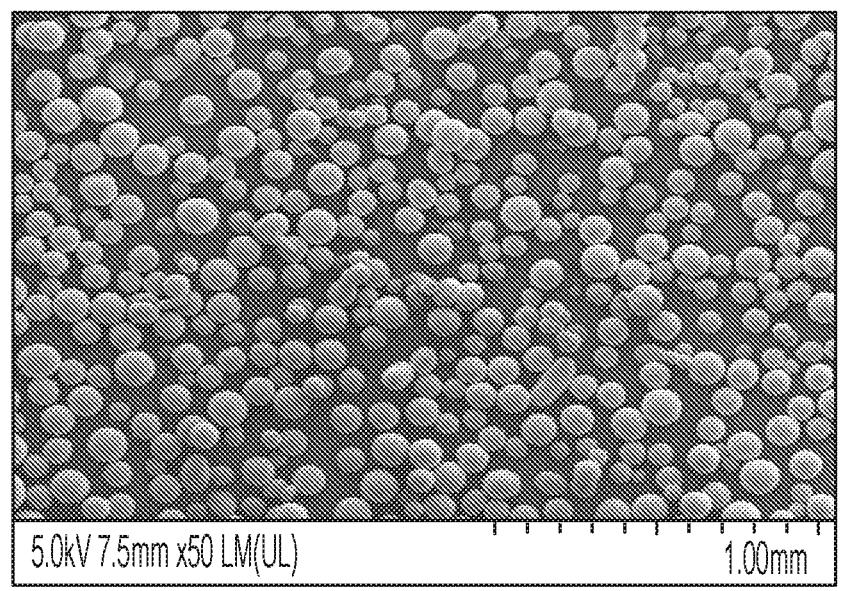
FIG. 11 is a scanning electron micrograph of polyamide particles.

| Sample | D50 (μm) | Diameter Span | SEM Micrograph |
|---|---|---|---|
| 1-3 | 38 | 0.92 | FIG. 5 |
| 1-4 | 43 | 0.82 | FIG. 6 |
| 1-5 | 76 | 0.65 | FIG. 7 |
| 1-6 | 98 | 0.79 | FIG. 8 |
| 1-7 | 104 | 0.75 | FIG. 9 |
| 1-8 | 96 | 0.83 | FIG. 10 |
| 1-9 | 100 | 0.60 | FIG. 11 |

This example illustrated general trends of (a) increasing oil viscosity decreases the particle size and the diameter span (e.g., comparing 1-1 to 1-3 and comparing 1-6 to 1-5), (b) increasing polymer loading increases the particle size and decreases the diameter span (e.g., comparing 1-4 to 1-5 and comparing 1-1 to 1-7), and (c) increasing processing temperature decreases the particle size and the diameter span (e.g., comparing 1-8 to 1-5 and comparing 1-1 to 1-2).

Additionally, inductively coupled plasma was performed on the particles having been digested in $HNO_3/HF/H_2O_2$ mixture using a closed-vessel microwave or oven for digestion to determine the silica content, which relates to the residual PDMS. The amount of silica found in the nine samples ranged from about 234 ppm to about 374 ppm. For the sample with about 234 ppm of silica, it is estimated that there is only about 0.62 g of PDMS present per 1000 g of particles. Without being limited by theory, it is believed that said PDMS is present primarily on the surface of the particles.

Example 2. Polyamide 12 microparticles were produced in a 25 mm twin-screw extruder (Werner & Pfleiderer ZSK-25). The carrier fluid was PDMS oil with 10,000 cSt viscosity at room temperature. The concentrations of components in the final mixture in the extruder are provided in Table 3. The polymer pellets were added to the extruder, brought to temperature, and then preheated carrier fluid having AEROSIL® R812S silica nanoparticles dispersed therein added to the molten polymer in the extruder. Other operational parameters are provided in Table 3. Then the mixture was discharged into a container and allowed to cool to room temperature over several hours. The light scattering particle size data is also provided in Table 3.

TABLE 3

| Sample | 2-1 | 2-2 | 2-3 | 2-4 | 2-5 | 2-6 |
|---|---|---|---|---|---|---|
| Rpm | 900 | 1100 | 1100 | 900 | 900 | 1100 |
| wt % polyamide 12* | 47 | 47 | 47 | 47 | 38 | 38 |
| wt % silica** | 1.1 | 1.1 | 1.1 | 1.1 | 1.1 | 1.1 |
| Temp. (° C.) | 230 | 230 | 250 | 250 | 230 | 230 |
| D10 (μm) | 30.5 | 31.2 | 26.2 | 25.4 | 35.6 | 54.2 |
| D50 (μm) | 57.8 | 50.3 | 38.1 | 38.5 | 72.8 | 111 |
| D90 (μm) | 101 | 80.1 | 55.3 | 57.9 | 131 | 220 |

*relative total combined weight of PDMS oil and polyamide
**relative to polyamide Example 3. ELASTOLLAN® 1190A10 thermoplastic polyurethane (TPU) added to the 25 mm twin-screw extruder (Werner & Pfleiderer ZSK-25), brought to temperature, and then preheated 10,000 cSt PDSM oil having AEROSIL® RX50 silica nanoparticles dispersed therein added to the molten polymer in the extruder. The conditions and results are presented in Table 4.

TABLE 4

| Sample | Screw RPM | Extruder Temp (° C.) | wt % TPU* | wt % silica** | Silica | D10 (μm) | D50 (μm) | D90 (μm) |
|---|---|---|---|---|---|---|---|---|
| 3-1 | 1100 | 240 | 53 | 1.3 | RX50 | 54.2 | 69.0 | 86.6 |
| 3-2 | 900 | 240 | 53 | 1.3 | RX50 | 59.2 | 74.5 | 94.8 |
| 3-3 | 1100 | 240 | 53 | 1.3 | RX50 | 57.6 | 75.3 | 97.8 |
| 3-4 | 1100 | 240 | 53 | 1.3 | RX50 | 49.5 | 65.1 | 85.0 |
| 3-5 | 1100 | 240 | 42 | 2.1 | RX50 | 26.3 | 41.9 | 65.1 |
| 3-6 | 1100 | 240 | 42 | 2.1 | RX50 | 28.9 | 42.0 | 60.2 |
| 3-7 | 1100 | 240 | 50 | 1.00 | RX50 | 56.5 | 76.3 | 103.0 |
| 3-8 | 1100 | 240 | 46 | 1.17 | RX50 | 44.6 | 61.7 | 84.7 |
| 3-9 | 1100 | 240 | 46 | 1.17 | RX50 | 38.2 | 46.5 | 56.5 |
| 3-10 | 1100 | 260 | 51 | 0.96 | RX50 | 53.5 | 64.0 | 75.7 |
| 3-11 | 1100 | 260 | 53 | 0.59 | R812S | 21.3 | 26.1 | 32.3 |
| 3-12 | 1100 | 260 | 51 | 0.64 | R812S | 19.5 | 24.0 | 29.7 |
| 3-13 | 1100 | 240 | 48 | 0.72 | R812S | 15.2 | 25.0 | 38.8 |
| 3-14 | 1100 | 240 | 52 | 0.62 | R812S | 20.8 | 35.1 | 57.5 |
| 3-15 | 1100 | 240 | 53 | 0.39 | R812S | 44.3 | 59.8 | 80.5 |
| 3-16 | 1100 | 240 | 47 | 0.50 | R812S | 21 | 34.8 | 54.8 |
| 3-17 | 1100 | 260 | 54 | 0.37 | R812S | 35.6 | 43.0 | 51.7 |

*relative to total combined weight of PDMS oil and TPU
**relative to TPU

Example 4. Polypropylene microparticles were produced in a Haake small-scale double screw extruder with high shear rotors. The carrier fluid was PDMS oil of either 30,000 cSt or 60,000 cSt viscosity at room temperature. The concentrations of components in the final mixture in the extruder are provided in Table 15. The order of addition of components to the extruder were either (a) the carrier fluid was added to the extruder, brought to temperature, and then room temperature polymer pellets added to the heated carrier fluid in the extruder or (b) where the polymer pellets were added to the extruder, brought to temperature, and then room temperature carrier fluid added to the molten polymer in the extruder. The polypropylene pellets were added at 30% solids loading (that is, 18 g polypropylene in 60 g PDMS). The polypropylene used was PP D115A polypropylene homopolymer, available from Baskem USA. At temperature of either 225° C. or 250° C. (see Table 5), the extruder was operated at approximately 200 rpm for 30 minutes. Then, the mixture was discharged from the extruder onto a cold surface to provide rapid quench cooling. During heating, at temperature, and cooling, the torque of the extruder system was measured. The resultant mixture was then washed three times with 300 mL of heptane and filtered through a 90 mm WHATMAN® #1 paper filter (available from SigmaAldrich) to separate the polypropylene particles from the carrier fluid. The particles were then allowed to air dry overnight in an aluminum pan in a fume hood. The dried polypropylene particles were characterized for morphology with SEM micrographs and for size with a Malvern MASTERSIZER™ 3000 Aero S particle size analyzer. Thermal properties were evaluated using Differential Scanning calorimetry (DSC) to determine the melting temperature and crystallization temperature. Inductively Coupled Plasma (ICP) determined the residual silicone oil present on the particles.

In this example, powder flow of particulates was characterized through sieving and angle of repose measurements. The sieved yield of the particulates was determined by exposing a quantity of particulates to a 250 mm U.S.A. Standard Sieve (ASTM E11) and determining the fraction by mass of particulates passing through the sieve relative to the total quantity of particulates. The sieve was used manually without particular conditions of duration of force. Angle of repose measurements were performed using a Hosokawa Micron Powder Characteristics Tester PT-R using ASTM D6393-14 "Standard Test Method for Bulk Solids" Characterized by Carr Indices." The results are described in Table 5.

The SEM micrographs depict smooth round particles with a fairly wide particle size distribution. The particles were selectively laser sintered in a single layer on the Sharebot SnowWhite SLS printer. Particles made using 30,000 cSt oil required higher laser power to produce a robust sintered single layer relative to the 60,000 cSt oil particles. Particles made using 60,000 cSt oil showed extreme edge curl as laser power increased.

TABLE 5

| Example | Ex 4-1 | Ex 4-2 | Ex 4-3 | Ex 4-4 |
| --- | --- | --- | --- | --- |
| PDMS Viscosity | 30,000 cSt | 60,000 cSt | 60,000 cSt | 30,000 cSt |
| Temperature | 250° C. | 250° C. | 225° C. | 225° C. |
| Percent Sieved Yield (thru 250 μm sieve) | 62% | 65% | 71% | 78% |
| D10 (μm) sieved | 33.0 | 25.8 | 21.8 | 36.4 |
| D50 (μm) sieved | 66.9 | 47.2 | 40.8 | 65.7 |
| D90 (μm) sieved | 118 | 84.9 | 72.4 | 110 |
| Span | 1.27 | 1.25 | 1.24 | 1.12 |
| Angle of Repose (°) | 42.7 | 42.3 | 40.2 | 36.1 |
| Melting Temperature (Tm) | 164° C. | 163° C. | 164° C. | 162° C. |
| Crystallization Temperature (Tc) | 120° C. | 114° C. | 111° C. | 113° C. |
| Sintering Window | 44° C. | 49° C. | 53° C. | 49° C. |
| ICP-Si | 825.4 ppm | 807.25 ppm | 433.25 ppm | 555.35 ppm |
| Sintering Temperature | 115° C. | 115° C. | 115° C. | 115° C. |
| Laser Power Range | 60-80% | 45-65% | 50-65% | 55-80% |

Example 5. Polyamide 12 microparticles were produced in a 25 mm twin-screw extruder (Werner & Pfleiderer ZSK-25). The carrier fluid was PDMS oil with 60,000 cSt viscosity at room temperature. The concentrations of components in the final mixture in the extruder are provided in Table 6. The polymer pellets were added to the extruder, brought to temperature, and then preheated carrier fluid having silica nanoparticles dispersed therein added to the molten polymer in the extruder. Other operational parameters are provided in Table 6. Then, the mixture was discharged into a container and allowed to cool to room temperature over several hours. The light scattering particle size data is also provided in Table 6.

TABLE 6

| Sample | Screw RPM | Extruder Temp (° C.) | wt % PA* | wt % silica** | Silica | D10 (μm) | D50 (μm) | D90 (μm) |
| --- | --- | --- | --- | --- | --- | --- | --- | --- |
| 5-1 | 1000 | 280 | 45% | 0.20% | R812S | 38.6 | 60.2 | 93.2 |
| 5-2 | 1000 | 280 | 45% | 0.20% | R812S | 31.5 | 47.9 | 72.1 |
| 5-3 | 1000 | 280 | 45% | 0.10% | R812S | 24.7 | 39.3 | 62.8 |
| 5-4 | 250 | 280 | 45% | 0.10% | R812S | 31 | 48.4 | 75.6 |
| 5-5 | 1000 | 280 | 35% | 0.10% | R812S | 19.9 | 35 | 62.6 |
| 5-6 | 1000 | 280 | 35% | 0.75% | X24*** | 15.9 | 27.7 | 54.1 |
| 5-7 | 1000 | 280 | 40% | 0.75% | X24 | 19.2 | 32.3 | 60.5 |
| 5-8 | 1000 | 270 | 30% | 0.25% | R812S | 21.6 | 34.4 | 53.7 |
| 5-9 | 1000 | 290 | 30% | 0.25% | R812S | 16.8 | 29.7 | 53.7 |
| 5-10 | 1000 | 290 | 30% | 0.75% | X24 | 17 | 29.6 | 52.6 |
| 5-11 | 1000 | 270 | 30% | 0.75% | X24 | 17.5 | 30.1 | 54.2 |

TABLE 6-continued

| Sample | Screw RPM | Extruder Temp (° C.) | wt % PA* | wt % silica** | Silica | D10 (μm) | D50 (μm) | D90 (μm) |
|---|---|---|---|---|---|---|---|---|
| 5-12 | 250 | 250 | 30% | 0.50% | R812S | 23.1 | 36.9 | 57.8 |
| 5-13 | 1000 | 250 | 30% | 0.50% | R812S | 20.6 | 34.1 | 56.4 |
| 5-14 | 500 | 250 | 30% | 0.50% | R812S | 22.9 | 39.8 | 71 |
| 5-15 | 500 | 250 | 30% | 0.50% | R812S | 21.3 | 36.6 | 63.2 |
| 5-16 | 250 | 290 | 30% | 1% | R812S | 16 | 25.3 | 39 |
| 5-17 | 1000 | 290 | 30% | 1% | R812S | 14.5 | 22 | 33.1 |
| 5-18 | 250 | 250 | 30% | 1% | R812S | 21.3 | 33 | 50.6 |
| 5-19 | 1000 | 250 | 30% | 1% | R812S | 18.6 | 28.3 | 43.4 |

*relative to the total combined weight of PDMS oil and polyamide
**relative to the weight of polyamide
***X24 is a silica powder available from ShinEtsu having an average particle size of 0.1 μm, a specific gravity of 1.8, and a water content of 2%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
   providing a mixture comprising an emulsion stabilizer, a thermoplastic polymer, and a carrier fluid that is immiscible with the thermoplastic polymer at a temperature greater than a melting point or softening temperature of the thermoplastic polymer;
   shearing the mixture in an extruder at the temperature greater than the melting point or softening temperature of the thermoplastic polymer and at a shear rate sufficiently high to disperse the thermoplastic polymer in the carrier fluid as molten thermoplastic polymer droplets to form an emulsion with the emulsion stabilizer between the thermoplastic polymer and the carrier fluid;
   wherein the emulsion stabilizer comprises nanoparticles having a D50 of 1 nm to 500 nm and the nanoparticles comprise a plurality of metal oxide nanoparticles, carbon black, or any combination thereof;
   cooling the emulsion to below the melting point or softening temperature of the thermoplastic polymer to form solidified particles in the presence of the nanoparticles, the solidified particles having a circularity of 0.90 or greater and comprising the thermoplastic polymer and the nanoparticles forming a coating upon an outer surface of the solidified particles;
      wherein cooling the emulsion to form the solidified particles takes place in the extruder and/or after the emulsion exits the extruder; and
   separating the solidified particles from the carrier fluid.

2. The method of claim 1, wherein at least some of the nanoparticles are embedded in an outer surface of the solidified particles.

3. The method of claim 1, wherein at least some of the solidified particles have a void therein, the void having the nanoparticles at a void/thermoplastic polymer interface.

4. The method of claim 3, wherein the nanoparticles are embedded in the void/thermoplastic polymer interface.

5. The method of claim 3, wherein the void contains the carrier fluid.

6. The method of claim 1, wherein the nanoparticles comprise silica nanoparticles.

7. The method of claim 1, wherein the solidified particles further comprise elongated structures on the outer surface of the solidified particles, wherein the elongated structures comprise the thermoplastic polymer.

8. The method of claim 1, wherein the emulsion stabilizer is present in the mixture at 0.01 wt % to 10 wt % by weight of the thermoplastic polymer.

9. The method of claim 1, wherein the thermoplastic polymer is present the mixture at 5 wt % to 60 wt % of the mixture.

10. The method of claim 1, wherein the thermoplastic polymer is selected from the group consisting of polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters, polylactic acid, polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block, grafted or ungrafted thermoplastic polyolefins, functionalized or nonfunctionalized ethylene/vinyl monomer polymers, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and any combination thereof.

11. The method of claim 1, wherein the melting point or softening temperature of the thermoplastic polymer is 50° C. to 450° C.

12. The method of claim 1, wherein the temperature above the melting point or softening temperature of the thermoplastic polymer is about 1° C. to about 50° C. greater than the melting point or softening temperature of the thermoplastic polymer.

13. The method of claim 1, wherein the carrier fluid is selected from the group consisting of silicone oil, fluorinated silicone oils, perfluorinated silicone oils, polyethylene glycols, alkyl-terminal polyethylene glycol, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

14. The method of claim 1, wherein cooling is at a rate of about 10° C./hour to about 100° C./second.

15. The method of claim 1, wherein the extruder is selected from the group consisting of a single screw extruder, a twin-screw extruder, and an extruder that includes more than two co-rotating or counter-rotating screws.

16. The method of claim 1, wherein the extruder has two or more zones at different temperatures.

17. The method of claim 1, wherein the solidified particles have a D10 of about 0.5 μm to about 125 μm, a D50 of about 1 μm to about 200 μm, and a D90 of about 70 μm to about 300 μm, wherein D10<D50<D90.

18. The method of claim 1, wherein the solidified particles have a diameter span of about 0.2 to about 10.

19. A method comprising:
adding an emulsion stabilizer comprising nanoparticles having a D50 of 1 nm to 500 nm, a thermoplastic polymer, and a carrier fluid, in any order, to an extruder to produce a mixture;
wherein the carrier fluid is immiscible with the thermoplastic polymer at a temperature greater than a melting point or softening temperature of the thermoplastic polymer, and the emulsion stabilizer is not an internal additive of the thermoplastic polymer; and
wherein the nanoparticles comprise a plurality of metal oxide nanoparticles, carbon black, or any combination thereof;
shearing the mixture in the extruder at about 1° C. to about 50° C. greater than the melting point or softening temperature of the thermoplastic polymer and at a shear rate sufficiently high to form an emulsion comprising molten thermoplastic polymer droplets dispersed in the carrier fluid with the emulsion stabilizer at an interface between the molten thermoplastic polymer droplets and the carrier fluid;
cooling the emulsion to below the melting point or softening temperature of the thermoplastic polymer at a rate of about 10° C./hour to about 100° C./second to form solidified particles in the presence of the nanoparticles, the solidified particles having a circularity of 0.90 or greater and comprising the thermoplastic polymer and the nanoparticles forming a coating upon an outer surface of the solidified particles;
wherein cooling the emulsion to form the solidified particles takes place in the extruder and/or after the emulsion exits the extruder; and
separating the solidified particles from the carrier fluid.

* * * * *